Feb. 16, 1971　　　　　　O. SCHWARZ　　　　　　3,564,403
APPARATUS AND METHOD FOR THE SIMULTANEOUS SEVERING
AND CONTINUITY TESTING OF WIRE COILS
Filed Oct. 9, 1968
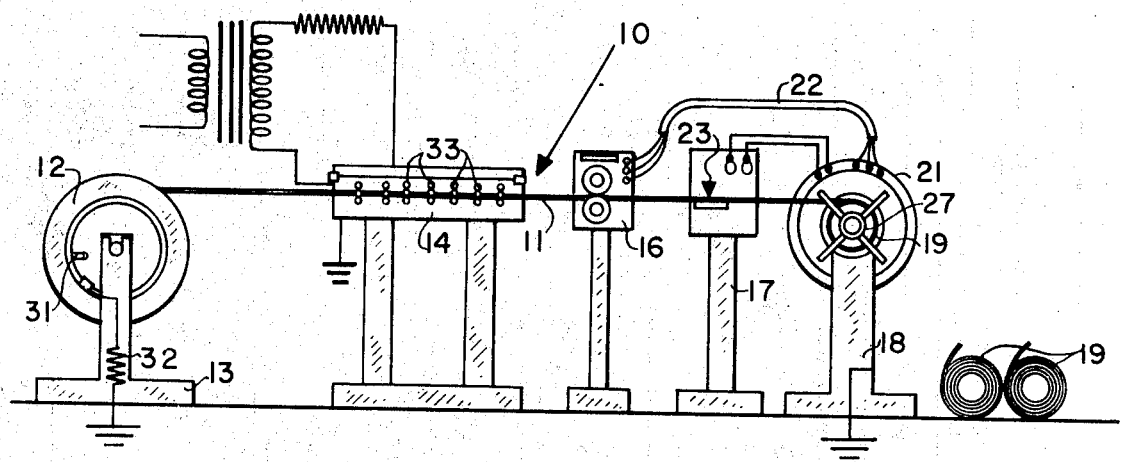
Fig.1
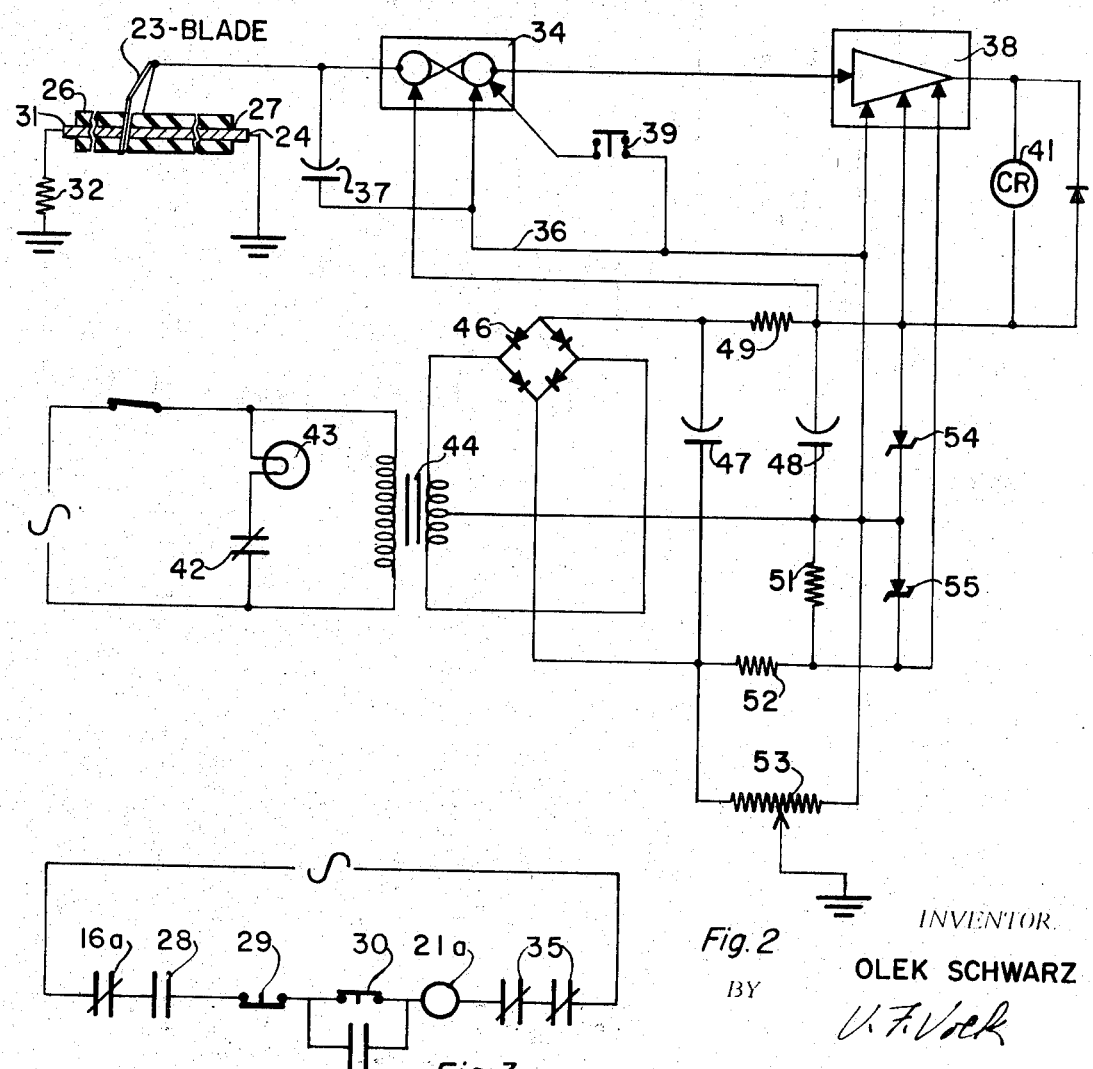
Fig.2
Fig.3
INVENTOR.
OLEK SCHWARZ
BY
HIS AGENT

United States Patent Office 3,564,403
Patented Feb. 16, 1971

---

3,564,403
APPARATUS AND METHOD FOR THE SIMULTANEOUS SEVERING AND CONTINUITY TESTING OF WIRE COILS
Olek Schwarz, Plainfield, N.J., assignor to Anaconda Wire and Cable Company, a corporation of Delaware
Filed Oct. 9, 1968, Ser. No. 766,166
Int. Cl. G01r *31/02*
U.S. Cl. 324—51
14 Claims

ABSTRACT OF THE DISCLOSURE

In a spark tester and coiler for insulated conductor, the continuity of the conductor in each coil is automatically tested by means of a circuit that makes electrical contact through the cutting blade that severs the coil. The coil end of the conductor is grounded directly and the other end is grounded through resistance sufficiently high to appear open to the test circuit.

BACKGROUND OF THE INVENTION

In the manufacture of insulated electrical conductors, it is known continuously to test the applied insulation by passing the insulated conductor, with the metal grounded, through a chamber where electrodes, such as metal chains, apply elevated voltage to the outer surface of the insulation. This may be done in the course of some manufacturing operation such as insulation, extrusion or conductor stranding but my invention has particular application to cases where the testing is applied to stored conductor just prior to shipping. In any of these cases the testing may be combined with a coiling operation whereby the conductor is passed directly from the above-mentioned test chamber to a coiler where coils are formed of convenient length, such as 500 feet, for shipping. The coiler usually stops automatically when the desired length has been coiled, at the same time displaying a signal that notifies an operator to energize a mechanical knife to cut the conductor, remove the finished coil from its form and start up a new coil. This operation is known as spark testing and coiling, and to effect a reliable ground with minimum shock hazard to the operator during the spark testing operation both ends of the conductor under test have been grounded. This has been accomplished by grounding the leading end to the coiler frame and the trailing end to the pay-off reel both of which are thoroughly earth grounded by some well-known form of slip ring or sliding contact. By this means it is assured that both the pay-off and coiled supplies of the conductor will be grounded even if the conductor itself has an open.

Although these known spark tester coilers are satisfactory to test for insulation faults they do not test for conductor breaks or opens and this has to be done on each coil, usually manually, in the conventional operation. Merely checking continuity of the conductor on the supply reel is not sufficient since it does not indicate breaks that many occur or become evident during the coiling operation.

By means of my invention I propose to test both the insulation and conductor continuity of coils of insulated conductor during the coiling operation.

I further propose to accomplish these ends without diminishing the sensitivity of the spark-testing operation or increasing the shock hazard of spark testing.

SUMMARY

I have invented an improvement in an apparatus for continuously testing the insulation of an elongated electrical conductor comprising means cutting the conductor into a plurality of lengths, which improvement comprises means for sensing the continuity of the cut lengths. This sensing means makes electrical contact with the conductor through the knife blade or other cutting means and is associated with signal means, responsive to an open in any of the lengths. There may also be comprised means for automatically preventing the apparatus from starting in the event of an open. My improvement has particular application to a spark tester and coiler which includes high-voltage means for continuously spark-testing the insulated conductor. Preferably, the conductor is grounded through a resistor at the end upstream of the cutting means and means are provided to prevent the activation of the sensing means by currents that pass through this resistor. Preferably, also my apparatus comprises means for grounding the lengths being cut and means applying a current in series through the sensing means, the cutting means, the lengths and the grounding means. A more thorough understanding of my invention may be obtained from the appended drawing and detailed description thereof.

BRIEF DESCRIPTION OF THE DRAWING

FIG. 1 shows a side view of my apparatus.
FIG. 2 shows a wiring diagram of a preferred embodiment of the apparatus of FIG. 1.
FIG. 3 shows a wiring diagram of an element of the apparatus of FIG. 1.

DESCRIPTION OF THE PREFERRED EMBODIMENT

Referring to FIG. 1 my apparatus is indicated generally by the numeral 10. Here an insulated conductor 11 is being paid from a large supply reel 12 supported on a stand 13, through a spark tester 14 of known type, a counting machine 16, cutting apparatus 17 and coiler 18 whereby the supply of conductor on the reel 12 is formed into a plurality of separate coils shown stacked at 19. The size of the coils 19 can be established in advance by a setting of the counting machine 16 in a known manner, the counting machine automatically stopping a motor 21 of the coiler 18 which is connected by an appropriate cable 22 (see FIG. 3). It is known not only to have the motor drive circuit interrupted at reaching a preset footage on the counter 16 but to apply appropriate braking both to the coiler and to the pay-off reel 12, as required and to deenergize the spark tester 14. When one of the coils 19 has been formed on the coiler 18 and the apparatus has come to a stop, an operator cuts the conductor 11 by closing a switch on the cutter 17 which causes a knife blade 23 to descend through the insulated conductor. This insulated conductor comprises a metal wire 24 (FIG. 2) and an annular layer of insulation 26 both of which are, of course, severed by the blade 23. The starting end 27 of the wire 11 is bared and connected through the coiler frame to ground in a known manner and an upstream bared end 31 of the conductor 11 is grounded through a 100-ohm resistor 32. Although the spark tester itself has a high resistance in its circuit to reduce current flow through any insulation faults it is customary to ground both ends of the wire under test to be assured of adequate grounding in the event of an open either upstream or downstream of the high-voltage spark tester 14 which applies high voltage to the outside of the insulation 26 by conventional chain electrodes 33 or other known means. The resistor 32 in cooperation with features to be described is novel and has been introduced to permit me to make a continuity test of conductor on the coiler 18 by means of the knife blade 23 in spite of the fact that the conductor 24 has been grounded at its upstream end 31. This I accomplish by means of the circuit shown in FIG. 2, as follows. The knife blade 23 is connected to the input of a flip-flop circuit 34 across which is connected a 1000 mmf. condenser 37. The output of the flip-flop 34 feeds into a driver 38 and the flip-flop is reset after each use by means of a push-button 39 connected to a common 36. For the flip-flop circuit 34, I prefer to use the plug-in unit manufactured by Engineered Electronics Co., of Santa Ana, Calif., and designated model T–103. It will be understood that the flip-flop serves merely to close the circuit and hold it closed whenever the knife blade 23 is grounded through the coil 19 and it was selected because the short duration of contact of the blade 23 with the wire 24 requires a quick acting switch such as the preferred solid state flip-flop described. Other quick acting relay devices for accomplishing this purpose will also come within the scope of my invention.

Amplified current from the driver 38 passes through the coil 41 of a relay with normally closed contacts 42 in series with a signal lamp 43. A normally open contact 28 of the relay coil 41 will prevent the starting of the coiler motor starter 21a unless the flip-flop circuit is reset by push button 39 and ready for operation. This contact 28 is in series with a contact 16a of the counter mechanism 16, stop and start push buttons 29 and 30, and conventional overload contacts 35 in the circuit of a starter coil 21a of the motor 21 as shown in FIG. 3. For the driver 38 I prefer to use Engineered Electronics model T–134. Power supply for the circuit is obtained from a transformer 44 in cooperation with full wave rectifier 46. In the circuit of FIG. 2 the condenser 47 has a capacitance of 80 mf. and the condenser 48 10 mf. The resistor 49 has a value of 40 ohms, the resistor 51 has a value of 15,000 ohms, the resistor 52 has a value of 1,000 ohms, and the potentiometer 53 a value of 25,000 ohms. The ground contact of this potentiometer should be adjusted, as shall be described, to prevent the flip-flop from locking in by reason of grounding through the upstream conductor and resistor 32 if there is an opening in the conductor on the coil. The Zener diodes 54, 55 have breakdown voltages of 13 volts and resistances of 3 ohms at 190 milliamperes and I have found that diode number 1N2977 available from Allied Electronics, subsidiary of Allied Radio Corporation of Chicago, Ill. is suitable for use in the illustrated circuit. The potentiometer 53 should be adjusted in operation in the following manner: (a) energize the transformer 44, (b) reset the flip-flop circuit 34 by pressing the push button 39, (c) connect a jumper between the cutter knife blade 23 and the ungrounded side of resistor 32 with no cable strung up from the payoff reel 12 to the coiler 18, (d) adjust the potentiometer 53 so that the pilot light 43 will stay unlit, (e) move the jumper connection from the ungrounded side of resistor 32 to ground. When doing so the pilot light 43 should come on. If this does not occur at first trial, repeat (d) and (e) several times, resetting the flip-flop circuit each time by means of push button 39.

The foregoing description has been exemplary rather than definitive of my invention for which I desire an award of Letters Patent as defined in the following claims.

I claim;

1. In an apparatus for continuously testing the insulation of an elongated insulated conductor comprising means advancing said conductor from an upstream to a downstream station and means for cutting said conductor into a plurality of lengths, the improvement comprising:
   (a) sensing means making electrical contact with said conductor through said cutting means for sensing the continuity of said lengths while said conductor is being cut, and
   (b) signal means responsive to an open in any of said lengths.

2. The apparatus of claim 1 comprising means stopping said apparatus.

3. The apparatus of claim 1 comprising coiling means for said lengths.

4. The apparatus of claim 1 comprising high voltage means for continuously spark-testing said insulated conductor.

5. The apparatus of claim 2 comprising high voltage means for continuously spark-testing said insulated conductor.

6. The apparatus of claim 1 comprising means for grounding said lengths and means applying a current in series through said sensing means, said cutting means, said lengths, and said grounding means.

7. The apparatus of claim 2 comprising means for grounding said lengths and means applying a current in series through said sensing means, said cutting means, said lengths, and said grounding means.

8. The apparatus of claim 4 comprising an electrical resistor and means grounding said conductor through said resistor at the end of said conductor upstream of said cutting means, and means preventing the activation of said sensing means by currents passing through said resistor.

9. The apparatus of claim 3 comprising high-voltage means for continuously spark-testing said insulated conductor.

10. The apparatus of claim 3 comprising means for grounding said lengths and means applying a current in series through said sensing means, said cutting means, said lengths, and said grounding means.

11. The apparatus of claim 4 comprising means for grounding said lengths and means applying a current in series through said sensing means, said cutting means, said lengths, and said grounding means.

12. The apparatus of claim 6 comprising an electrical resistor and means grounding said conductor through said resistor at the end of said conductor upstream of said cutting means, and means preventing the activation of said sensing means by currents passing through said resistor.

13. The method of forming a coil of insulated wire and testing said coil for continuity comprising the steps of:
   (a) connecting the leading end of said wire to an electrically conducting circuit, said circuit comprising a blade for severing said coil from a supply of said insulated wire, and signal means responsive to the continuity of the wire in said coil,
   (b) winding said coil, and
   (c) severing said coil thereby passing current through said circuit and activating said signal means during the severing of said wire.

14. The method of claim 13 comprising the step of applying high electrical potential to the surface of said insulated wire to test for dielectric faults during the winding of said coil.

References Cited

UNITED STATES PATENTS

| 1,977,703 | 10/1934 | Swartwout | 324—54X |
| 2,454,011 | 11/1948 | Savage | 324—54 |
| 2,624,771 | 1/1953 | Hanson | 324—51X |
| 2,653,296 | 9/1953 | Weaver | 324—51 |
| 3,378,924 | 4/1968 | Porter | 83—522X |

GERARD R. STRECKER, Primary Examiner

U.S. Cl. X.R.:
83—522; 324—54